US010765087B1

(12) United States Patent
Massey et al.

(10) Patent No.: US 10,765,087 B1
(45) Date of Patent: Sep. 8, 2020

(54) WALKER FOR ANIMALS

(71) Applicant: LOMA LINDA ACADEMY, Loma Linda, CA (US)

(72) Inventors: Reuben Robin Massey, Colton, CA (US); Aidan Covert Richards, Highland, CA (US); Abigail Elaine Tching, Redlands, CA (US); Charles Justin Umeda, Loma Linda, CA (US); Allison Eun Young Kim, Loma Linda, CA (US); Jaden Wil Nation, Redlands, CA (US); Andrew David Zinke, Loma Linda, CA (US); William Wen-Han Abel, Redlands, CA (US)

( * ) Notice: Subject to any disclaimer, the term of this patent is extended or adjusted under 35 U.S.C. 154(b) by 0 days.

(21) Appl. No.: 15/884,831

(22) Filed: Jan. 31, 2018

Related U.S. Application Data

(60) Provisional application No. 62/452,980, filed on Jan. 31, 2017.

(51) Int. Cl.
*A01K 29/00* (2006.01)
*A01K 15/02* (2006.01)
*A61H 3/04* (2006.01)

(52) U.S. Cl.
CPC .............. *A01K 15/02* (2013.01); *A01K 29/00* (2013.01); *A61H 3/04* (2013.01); *A61H 2201/0161* (2013.01); *A61H 2201/1642* (2013.01); *A61H 2203/03* (2013.01)

(58) Field of Classification Search
CPC ...... A01K 15/02; A01K 15/027; A01K 29/00; A61D 3/00; A61D 2003/006
See application file for complete search history.

(56) References Cited

U.S. PATENT DOCUMENTS

| 3,241,851 | A | * | 3/1966 | Dingbaum | A61D 9/00 |
| | | | | | 280/657 |
| 4,375,203 | A | * | 3/1983 | Parkes | A61D 9/00 |
| | | | | | 119/727 |
| 4,777,910 | A | * | 10/1988 | Pecor | A01K 15/027 |
| | | | | | 119/702 |
| 5,823,146 | A | * | 10/1998 | Alaniz | A01K 15/00 |
| | | | | | 119/725 |
| 7,549,398 | B2 | * | 6/2009 | Robinson | A61D 3/00 |
| | | | | | 119/727 |
| 8,919,291 | B2 | * | 12/2014 | De La Celle | A61D 9/00 |
| | | | | | 119/727 |

(Continued)

FOREIGN PATENT DOCUMENTS

| WO | WO-2012007935 A2 | * | 1/2012 | ............. A61H 3/04 |
| WO | WO-2018147022 A1 | * | 8/2018 | ............. A01K 15/02 |

*Primary Examiner* — Kristen C Hayes
(74) *Attorney, Agent, or Firm* — Chang & Hale LLP

(57) ABSTRACT

A walker for an animal can include a body support assembly configured to provide support for a torso of the animal. A rear portion of the body support assembly can be configured to allow motion of rear legs of the animal on a surface. The walker can further include a front support assembly coupled to a front portion of the body support assembly, and configured to allow front legs of the animal to rest thereon such that the front legs are held away from the surface. The walker can further include a leg assembly coupled to the body support assembly, and configured to provide support for the animal in place of the front legs, and to facilitate motion of the animal on the surface based on the motion of the rear legs.

16 Claims, 6 Drawing Sheets

(56) References Cited

U.S. PATENT DOCUMENTS

| | | | |
|---|---|---|---|
| 9,179,646 B2* | 11/2015 | Shalom | A61H 3/04 |
| 9,962,249 B2* | 5/2018 | Newby | A61D 3/00 |
| 2013/0104813 A1* | 5/2013 | Shalom | A61H 3/04 |
| | | | 119/727 |

* cited by examiner

WALKER FOR ANIMALS

CROSS-REFERENCE TO RELATED APPLICATION(S)

This application claims priority to U.S. Provisional Application No. 62/452,980 filed Jan. 31, 2017, entitled WALKER FOR FOUR LEGGED ANIMALS, the disclosure of which is hereby expressly incorporated by reference herein in its respective entirety.

BACKGROUND

Field

The present disclosure relates to devices for supporting injured or disabled animals such as dogs.

Description of the Related Art

An animal such as a dog can have its leg injured or be disabled otherwise, such that mobility becomes diminished. Even if the injured leg is healing from a proper treatment, the dog's mobility remains significantly reduced. Thus, the dog's quality of life and health can be affected in an undesirable manner.

SUMMARY

In some implementations, the present disclosure relates to a walker for an animal such as a dog. The walker includes a body support assembly having a front portion and a rear portion, and configured to provide support for a torso of the animal. The rear portion is configured to allow a range of motion of one or more rear legs of the animal on a surface. The walker further includes a front support assembly coupled to the front portion of the body support assembly, and configured to allow one or more front legs of the animal to rest thereon such that the one or more front legs are held away from the surface. The walker further includes a leg assembly coupled to the body support assembly, and configured to provide support for the animal in place of the one or more front legs, and to facilitate motion of the animal on the surface based on the range of motion of the one or more rear legs.

In some implementations, the present disclosure relates to a method for providing mobility for a dog having one or more injured or disabled front legs. The method includes supporting the dog's torso with a body support assembly having a front portion and a rear portion, with the rear portion being configured to allow a range of motion of the dog's rear legs on a surface. The method further includes supporting the dog's front legs with a front support assembly coupled to the front portion of the body support assembly, such that the front legs are held away from the surface. The method further includes providing support for the dog in place of the front legs with a leg assembly coupled to the body support assembly, with the leg assembly being configured to allow motion of the dog on the surface based on the range of motion of the rear legs.

In some implementations, the present disclosure relates to a kit for an injured or disabled dog. The kit includes a walker having a body support assembly with a front portion and a rear portion, and configured to provide support for a torso of the dog. The rear portion is configured to allow a range of motion of rear legs of the dog on a surface. The walker further includes a front support assembly coupled to or capable of being coupled to the front portion of the body support assembly, and configured to allow front legs of the dog to rest thereon such that the front legs are held away from the surface. The walker further includes a leg assembly coupled to or capable of being coupled to the body support assembly, and configured to provide support for the dog in place of the front legs, and to facilitate motion of the dog on the surface based on the range of motion of the rear legs.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1:
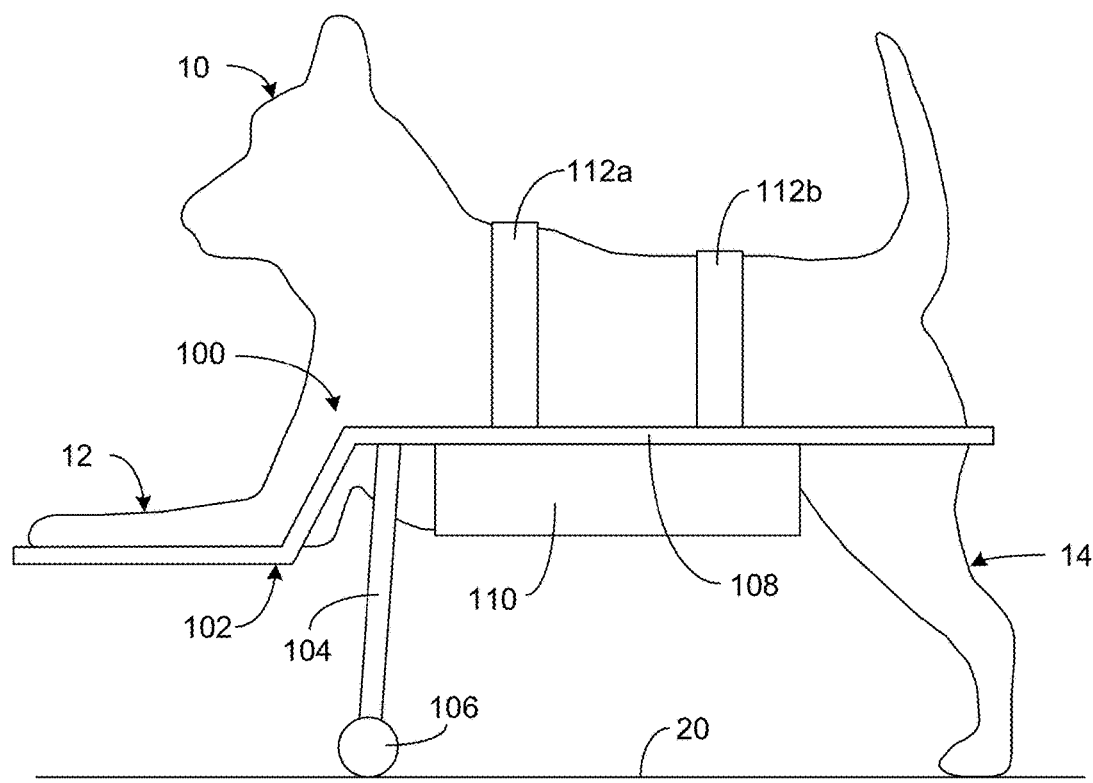
FIG. 1 depicts a walker being utilized by a four legged animal such as a dog.

FIG. 1 depicts a walker 100 being utilized by an animal such as a dog 10. For the purpose of description, it is assumed that such an animal has four legs; however, it will be understood that a device having one or more features as described herein can be utilized for an animal having different numbers of legs. For example, a four-legged animal may have a rear leg or a front leg amputated or permanently disabled; and such an animal can still benefit from use of the walker of FIG. 1. Also, although various examples are described herein in the context of such a walker being configured for use by a dog, it will be understood that one or more features of the present disclosure can also be implemented for use by animals.

In the example of FIG. 1, the dog 10 is assumed to have either or both its front legs 12 injured or non-functional so as to require support when standing. The dog's rear legs 14 are assumed to be functional, such that the dog 10 is able to stand and be mobile on a surface 20 using its rear legs and the assistance of the walker 100.

Figure 2:
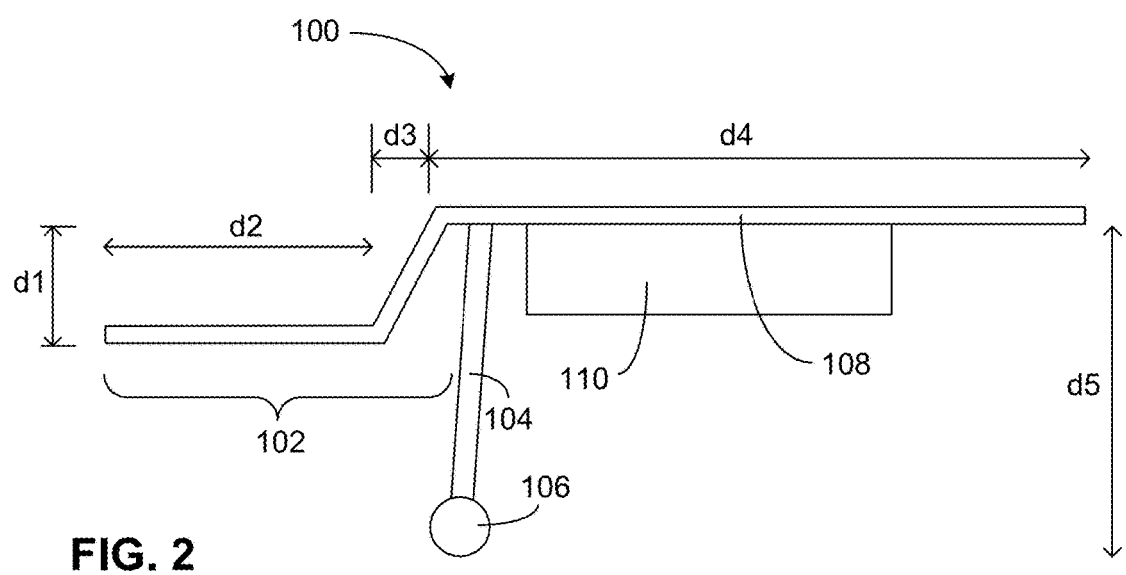
FIG. 2 shows the walker of FIG. 1, but without the dog.

FIG. 2 shows the same walker 100 of FIG. 1, but without the dog. FIGS. 1 and 2 show that in some embodiments, the walker 100 can include a front support structure collectively indicated as 102. Such a front support structure can be configured to provide support for the front legs 12 of the dog 10. Various examples of such a front support structure are described herein in greater detail.

As shown in FIGS. 1 and 2, the front support structure 102 can be coupled to a body frame 108 that is configured to provide structural integrity for the walker 100, and to facilitate support of the dog's body. For example, the body frame 108 can include two generally parallel members that are joined by one or more cross members. Between such parallel members, a body support 110 such as a fabric (e.g., canvas) body support can be provided. Such a body support can be dimensioned to provide support for the dog's torso. Various examples related to the body frame 108 and the body support 110 are described herein in greater detail.

As shown in FIGS. 1 and 2, the front support structure 102 can be coupled to the body frame 108 so as to provide an appropriate support configuration for the dog's front legs 12. For example, a front-leg resting portion of the front support structure 102 can be at a height that is lower than the height of the body frame 108 by approximately d1. Similarly, the front-leg resting portion of the front support structure 102 can be offset longitudinally from the the body frame 108 by approximately d3. With such a configuration, the front-leg resting portion can have a length dimension of approximately d2, and such a front-leg resting portion can be coupled to the body frame 108 by one or more angled members.

In the example of FIGS. 1 and 2, the front support structure 102 is shown to be configured such that the front legs 12 of the dog 10 are supported in a generally horizontal manner. It will be understood that in some embodiments, the front legs of the dog can be supported in different angles. Examples of such angled support of the front legs are described herein in greater detail.

In some embodiments, and as shown in FIGS. 1 and 2, the walker 100 can further include a leg assembly collectively indicated as 104. Such a leg assembly can be coupled to a front portion of the body frame 108, and be configured to provide support for the dog 10 when the dog's front legs 12 are off of the surface 20 and resting on the front support structure 102. Accordingly, the leg assembly 104 can be configured to provide support for the dog 10 in a manner similar to what the dog's front legs would provide if such legs are fully functional.

In some embodiments, and as described herein, the leg assembly 104 can include one or more legs dimensioned and oriented with respect to the body frame 108 so as to provide a vertical height of approximately d5 for the body frame 108. The leg assembly 104 can include a wheel assembly 106 implemented on the lower end so as to provide mobility for the dog 10. Examples related to the leg assembly 104 and the wheel assembly 106 are described herein in greater detail.

In the example of FIGS. 1 and 2, the body frame 108 is depicted as having a longitudinal length of approximately d4. Such a dimension, along with the foregoing dimensions d1, d2, d3 and d5, can be selected based on, for example, the dog's size and/or other physical characteristics.

Figure 3:
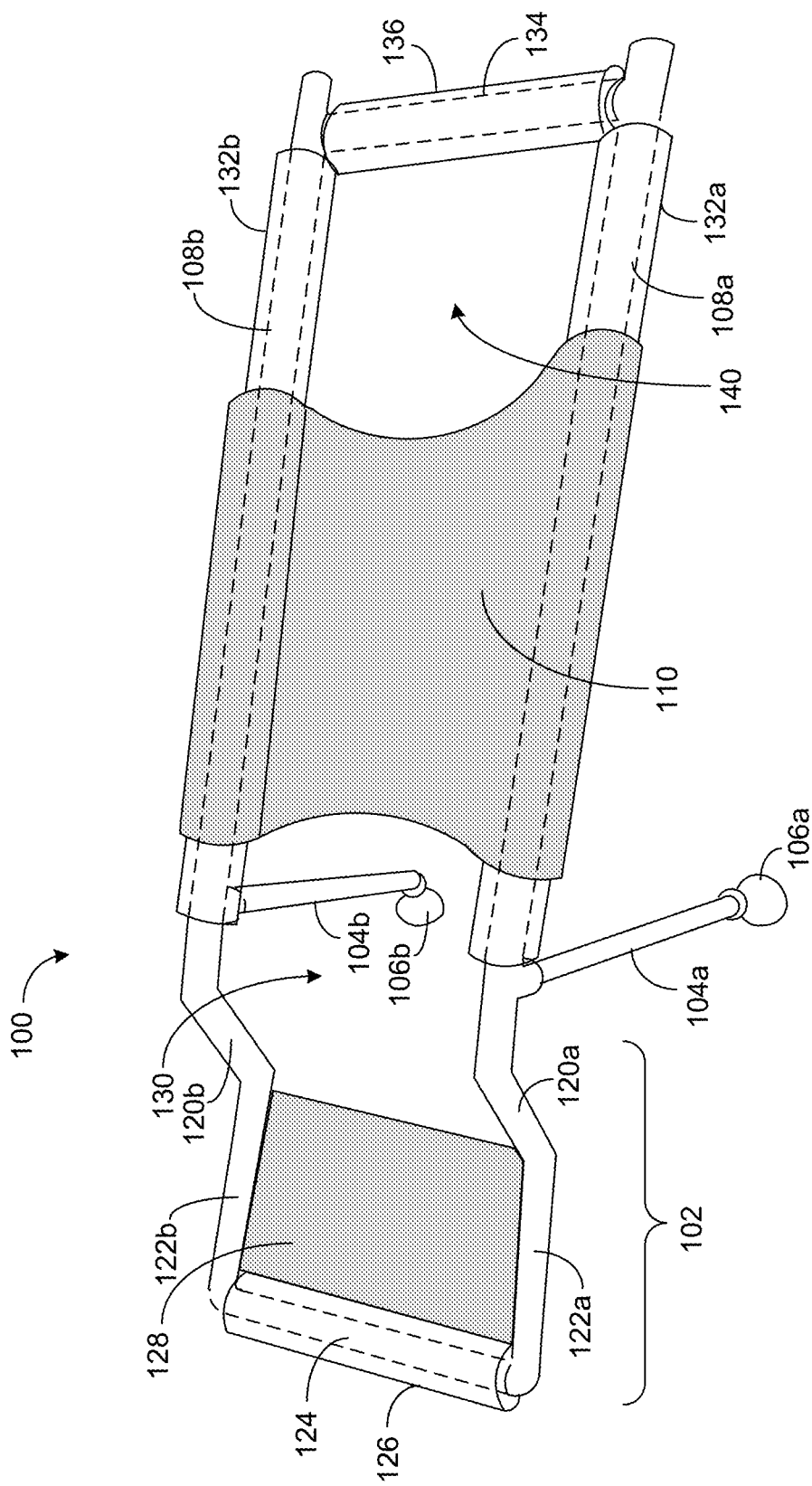
FIG. 3 shows an example embodiment of the walker of FIGS. 1 and 2.

FIG. 3 shows a first example embodiment of the walker 100 of FIGS. 1 and 2. FIG. 3 shows that in some embodiments, a walker 100 can include a body frame having first and second main members 108*a*, 108*b*. Such main members can extend generally longitudinally when in use, and can have an appropriate length and be spaced laterally to accommodate a dog's torso. In some embodiments, the first and second main members 108*a*, 108*b* can be secured at or near their back ends by a lateral brace member 134.

In the example of FIG. 3, the walker 100 can further include a front support structure 102 having first and second front members 122*a*, 122*b*. Such front members can extend generally longitudinally when in use, and can have an appropriate length and be spaced laterally to accommodate the dog's front legs. In some embodiments, the first and second front members can be secured at their front ends by a lateral brace member 124.

In the example of FIG. 3, the front end of the first main member 108*a* of the body frame is shown to be coupled to the back end of the first front member 122*a* of the front support structure 102 by a first angled member 120*a*. Similarly, the front end of the second main member 108*b* of the body frame is shown to be coupled to the back end of the second front member 122*b* of the front support structure 102 by a second angled member 120*b*. Each of the first and second angled members 120*a*, 120*b* is shown to angle down from the respective main member of the body frame to the respective front member of the front support structure. Accordingly, a front-leg resting portion of the front support structure 102 (e.g., defined by the first and second front members 122*a*, 122*b* and the lateral brace member 124) can be at a lower vertical level than the body frame. Such a lowered vertical level of the front-leg resting portion of the front support structure 102 can be selected based on, for example, the dog's size and/or other physical characteristics.

In the example of FIG. 3, the walker 100 is shown to further include a leg assembly having a first leg 104*a* associated with the first main member 108*a*, and a second leg 104*b* associated with the second main member 108*b*. More particularly, the upper portion of the first leg 104*a* is shown to be secured to a location at or near the front portion of the first main member 108*a*, and the upper portion of the second leg 104*b* is shown to be secured to a location at or near the front portion of the second main member 108*b*.

The lower portion of each of the first and second legs 104*a*, 104*b* is shown to include a wheel (106*a*, 106*b*) to facilitate mobility for the dog when the dog is placed in the walker 100. In some embodiments, the wheels 106*a*, 106*b* can be configured to swivel to thereby allow the dog/walker assembly to move in different directions, propelled by, for example, the dog's rear legs.

In the example of FIG. 3, the front support structure 102 can include a panel 128 that covers some or all of the area defined by the first and second front members 122*a*, 122*b* and the lateral brace member 124. Such a panel can allow the dog's front legs to rest thereon. Such a panel can be implemented as, for example, a generally rigid panel or a flexible panel (e.g., fabric, carpet, etc.). In some embodiments, the front support structure 102 may or may not include one or more straps to secure the dog's front legs when such legs are resting on the panel 128.

In the example of FIG. 3, a body support 110 can be provided to support the dog's torso. Such a body support can be implemented between the first and second main members 108*a*, 108*b*. In some embodiments, such a body support can be implemented as, for example, a flexible member (e.g., fabric) to generally wrap around the lower and lower-side portions of the dog's torso. In some embodiments, the body support 110 may or may not include one or more straps (e.g., such as the example straps 112*a*, 112*b* of FIG. 1) to secure the dog's torso to the walker 100.

In the example of FIG. 3, the body support 110 can be dimensioned so as to provide an opening 130 at or near the front portion of the first and second main members 108*a*, 108*b*, and an opening 140 at or near the rear portion of the first and second main members 108*a*, 108*b*. The front opening 130 can be dimensioned to, for example, accommodate the bent upper portion of the dog's front legs as the front legs are supported by the front support structure 102. The rear opening 140 can be dimensioned to, for example, accommodate the dog's hip and thereby allow the dog's rear legs to move freely, including movements associated with walking and sitting.

In some embodiments, some or all of the various extensions (e.g., first and second main members 108a, 108b, lateral brace 134, first and second front members 122a, 122b, lateral brace 124, angled members 120a, 120b) may or may not be covered by cushioned sleeves to facilitate comfort for the dog. For example, cushioned sleeves 132a, 132b can be provided for the first and second main members 108a, 108b. Similarly, a cushioned sleeve 136 can be provided for the lateral brace 134. Similarly, a cushioned sleeve 126 can be provided for the lateral brace 124.

Figure 4:
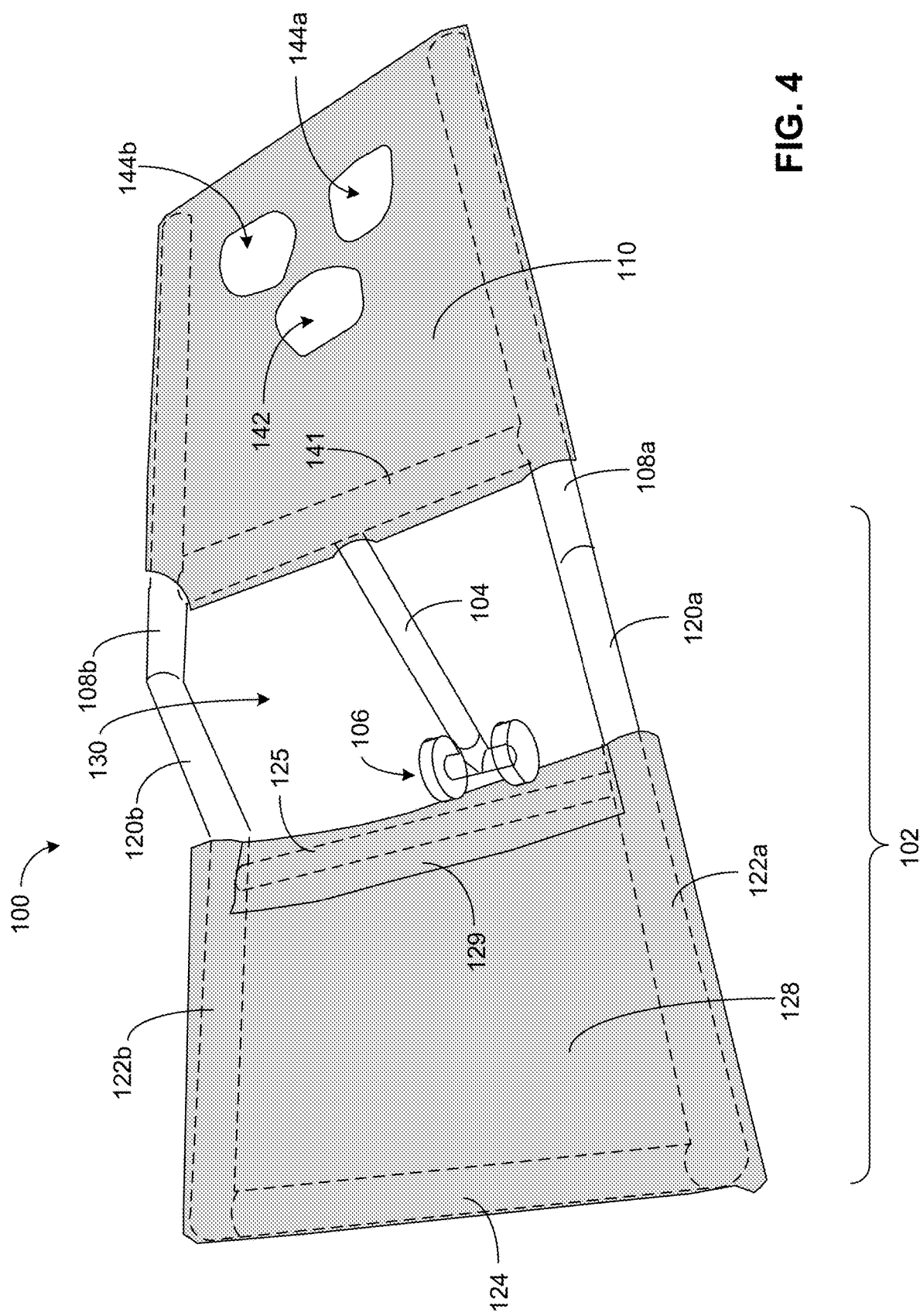
FIG. 4 shows another example embodiment of the walker of FIGS. 1 and 2.

FIG. 4 shows a second example embodiment of the walker 100 of FIGS. 1 and 2. FIG. 4 shows that in some embodiments, a walker 100 can include a body frame having first and second main members 108a, 108b. Such main members can extend generally longitudinally when in use, and can have an appropriate length and be spaced laterally to accommodate a dog's torso. In some embodiments, the first and second main members 108a, 108b can be secured to each other by a lateral brace member 141 at a location at or near the front portions of the first and second main members 108a, 108b.

Similarly, the walker 100 can further include a front support structure 102 having first and second front members 122a, 122b. Such front members can extend generally longitudinally when in use, and can have an appropriate length and be spaced laterally to accommodate the dog's front legs. In some embodiments, the first and second front members 122a, 122b be secured at their front ends by a lateral brace member 124. In some embodiments, a second lateral brace member 125 can be provided so as to secure the back ends of the first and second front members 122a, 122b.

In the example of FIG. 4, the front end of the first main member 108a of the body frame is shown to be coupled to the back end of the first front member 122a of the front support structure 102 by a first angled member 120a. Similarly, the front end of the second main member 108b of the body frame is shown to be coupled to the back end of the second front member 122b of the front support structure 102 by a second angled member 120b. Each of the first and second angled members 120a, 120b is shown to angle down from the respective main member of the body frame to the respective front member of the front support structure. Accordingly, a front-leg resting portion of the front support structure 102 (e.g., defined by the first and second front members 122a, 122b and the lateral brace member 124) can be at a lower vertical level than the body frame. Such a lowered vertical level of the front-leg resting portion of the front support structure 102 can be selected based on, for example, the dog's size and/or other physical characteristics.

In the example of FIG. 4, the walker 100 is shown to further include a leg assembly having a single leg 104. More particularly, the upper portion of the leg 104 is shown to be secured to a location at or near the mid portion of the lateral brace member 141.

The lower portion the leg 104 is shown to include a wheel assembly 106 to facilitate mobility for the dog when the dog is placed in the walker 100. In some embodiments, the wheel assembly 106 can be configured to swivel to thereby allow the dog/walker assembly to move in different directions, propelled by, for example, the dog's rear legs.

In the example of FIG. 4, the front support structure 102 can include a panel 128 that covers some or all of the area defined by the first and second front members 122a, 122b and the lateral brace member 124. Such a panel can allow the dog's front legs to rest thereon. Such a panel can be implemented as, for example, a generally rigid panel or a flexible panel (e.g., fabric, carpet, etc.). In some embodiments, the front support structure 102 may or may not include one or more straps to secure the dog's front legs when such legs are resting on the panel 128.

In the example of FIG. 4, the panel 128 is shown to be implemented as a fabric pouch that can be slipped over the front-leg resting portion of the front support structure 102 in a removable manner. Once installed as shown in FIG. 4, a flap 129 can wrap around the second lateral brace member 125 so as to secure the pouch (e.g., with hook and loop surfaces, snap fasters, etc.). To remove the pouch, the flap 129 can be un-done to allow the pouch to be slipped away from the front-leg resting portion of the front support structure 102.

In the example of FIG. 4, a body support 110 can be provided to support the dog's torso. Such a body support can be implemented between the first and second main members 108a, 108b. In some embodiments, such a body support can be configured to provide support for the dog's torso. In some embodiments, the body support 110 may or may not include one or more straps (e.g., such as the example straps 112a, 112b of FIG. 1) to secure the dog's torso to the walker 100.

In the example of FIG. 4, the body support 110 can be dimensioned so as to provide an opening 130 at or near the front portion of the first and second main members 108a, 108b. The front opening 130 can be dimensioned to, for example, accommodate the bent upper portion of the dog's front legs as the front legs are supported by the front support structure 102.

In the example of FIG. 4, the body support 110 can define openings 144a, 144b dimensioned and spaced to accommodate the dog's rear legs, and to allow the rear legs to move relatively freely, including movements associated with walking and sitting.

In the example of FIG. 4, the body support 110 can define an opening 142 dimensioned and positioned to, for example, accommodate urination by a male dog.

In some embodiments, some or all of the various extensions (e.g., first and second main members 108a, 108b, lateral brace 140, first and second front members 122a, 122b, lateral braces 124, 125, angled members 120a, 120b) may or may not be covered by cushioned sleeves to facilitate comfort for the dog.

Figure 5:
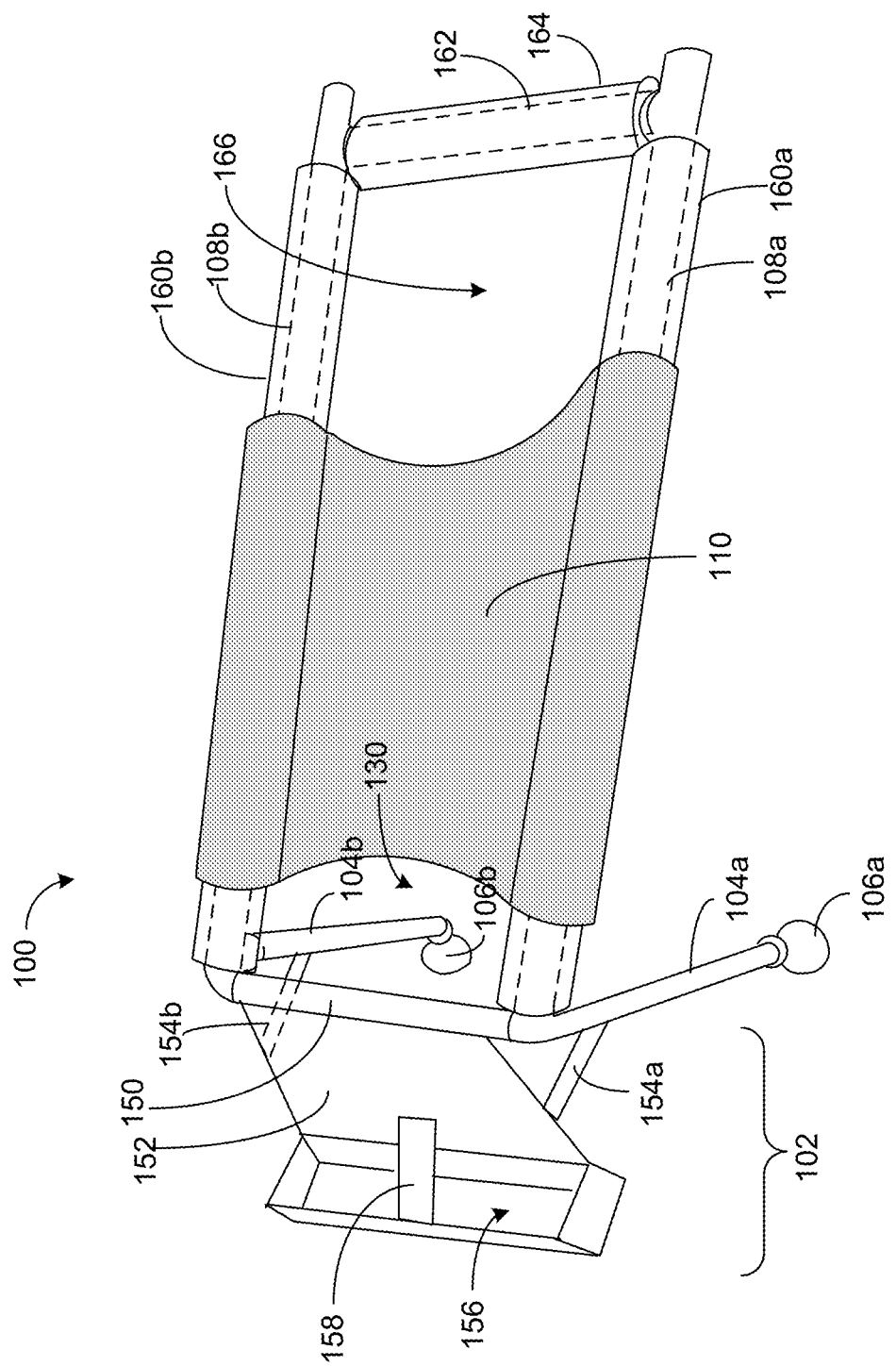
FIG. 5 shows yet another example embodiment of the walker of FIGS. 1 and 2.

FIG. 5 shows a third example embodiment of the walker 100 of FIGS. 1 and 2. FIG. 5 shows that in some embodiments, a walker 100 can include a body frame having first and second main members 108a, 108b. Such main members can extend generally longitudinally when in use, and can have an appropriate length and be spaced laterally to accommodate a dog's torso. In some embodiments, the first and second main members 108a, 108b can be secured to each other by a first lateral brace member 150 at or near the front portions of the first and second main members 108a, 108b, and a second lateral brace member 162 at or near the rear portions of the first and second main members 108a, 108b.

In the example of FIG. 5, the walker 100 can further include a front support structure 102 having an angled platform 152. Such an angled platform can be coupled to the first lateral brace member 150 so as to define an angle between the angled platform 152 and a plane defined by the first and second main members 108a, 108b. Such an angle can be selected to allow the dog's front legs to hang over the first lateral brace member 150 and be supported by the angled platform 152.

In the example shown in FIG. 5, the front support structure 102 can further include a pocket 156 formed at or near the lower end of the angled platform 152. The angled platform 152 and the pocket 156 can be dimensioned to allow the paws of the front legs to rest at least partially within the pocket 156. In some embodiments, a separator structure 158 can be provided to keep the two paws separated within the pocket 156.

In the example of FIG. 5, angled brace members 154a, 154b can be provided to hold the angled platform 152 at a desired angle relative to the plane defined by the first and second main members 108a, 108b. In some embodiments, such brace members can be configured to provide adjustability so as to allow the angle of the platform 152 to be adjusted.

In the example of FIG. 5, the walker 100 is shown to further include a leg assembly having a first leg 104a associated with the first main member 108a, and a second leg 104b associated with the second main member 108b. More particularly, the upper portion of the first leg 104a is shown to be secured to a location at or near the front portion of the first main member 108a, and the upper portion of the second leg 104b is shown to be secured to a location at or near the front portion of the second main member 108b.

The lower portion of each of the first and second legs 104a, 104b is shown to include a wheel (106a, 106b) to facilitate mobility for the dog when the dog is placed in the walker 100. In some embodiments, the wheels 106a, 106b can be configured to swivel to thereby allow the dog/walker assembly to move in different directions, propelled by, for example, the dog's rear legs.

In the example of FIG. 5, a body support 110 can be provided to support the dog's torso. Such a body support can be implemented between the first and second main members 108a, 108b. In some embodiments, such a body support can be implemented as, for example, a flexible member (e.g., fabric) to generally wrap around the lower and lower-side portions of the dog's torso. In some embodiments, the body support 110 may or may not include one or more straps (e.g., such as the example straps 112a, 112b of FIG. 1) to secure the dog's torso to the walker 100.

In the example of FIG. 5, the body support 110 can be dimensioned so as to provide an opening 130 at or near the front portion of the first and second main members 108a, 108b, and an opening 166 at or near the rear portion of the first and second main members 108a, 108b. The rear opening 166 can be dimensioned to, for example, accommodate the dog's hip and thereby allow the dog's rear legs to move freely, including movements associated with walking and sitting.

In some embodiments, some or all of the various extensions (e.g., first and second main members 108a, 108b and lateral braces 150, 162) may or may not be covered by cushioned sleeves to facilitate comfort for the dog. For example, cushioned sleeves 160a, 160b can be provided for the first and second main members 108a, 108b. Similarly, a cushioned sleeve 164 can be provided for the lateral brace 162.

Figure 6:
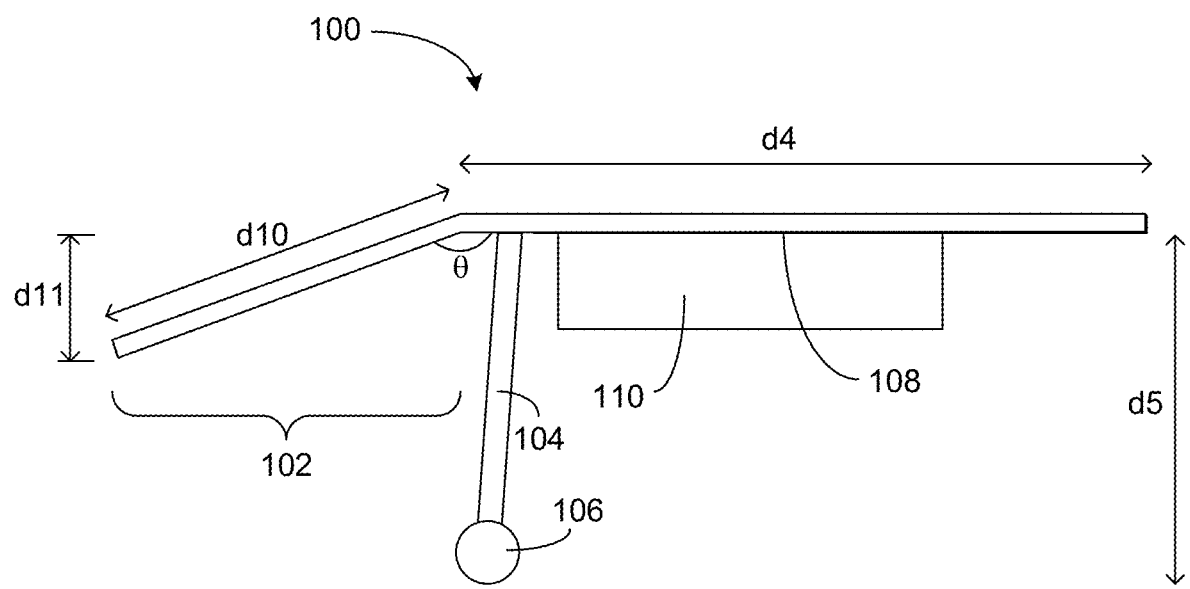
FIG. 6 shows a side view of yet another example embodiment of the walker of FIGS. 1 and 2.
Figure 7:
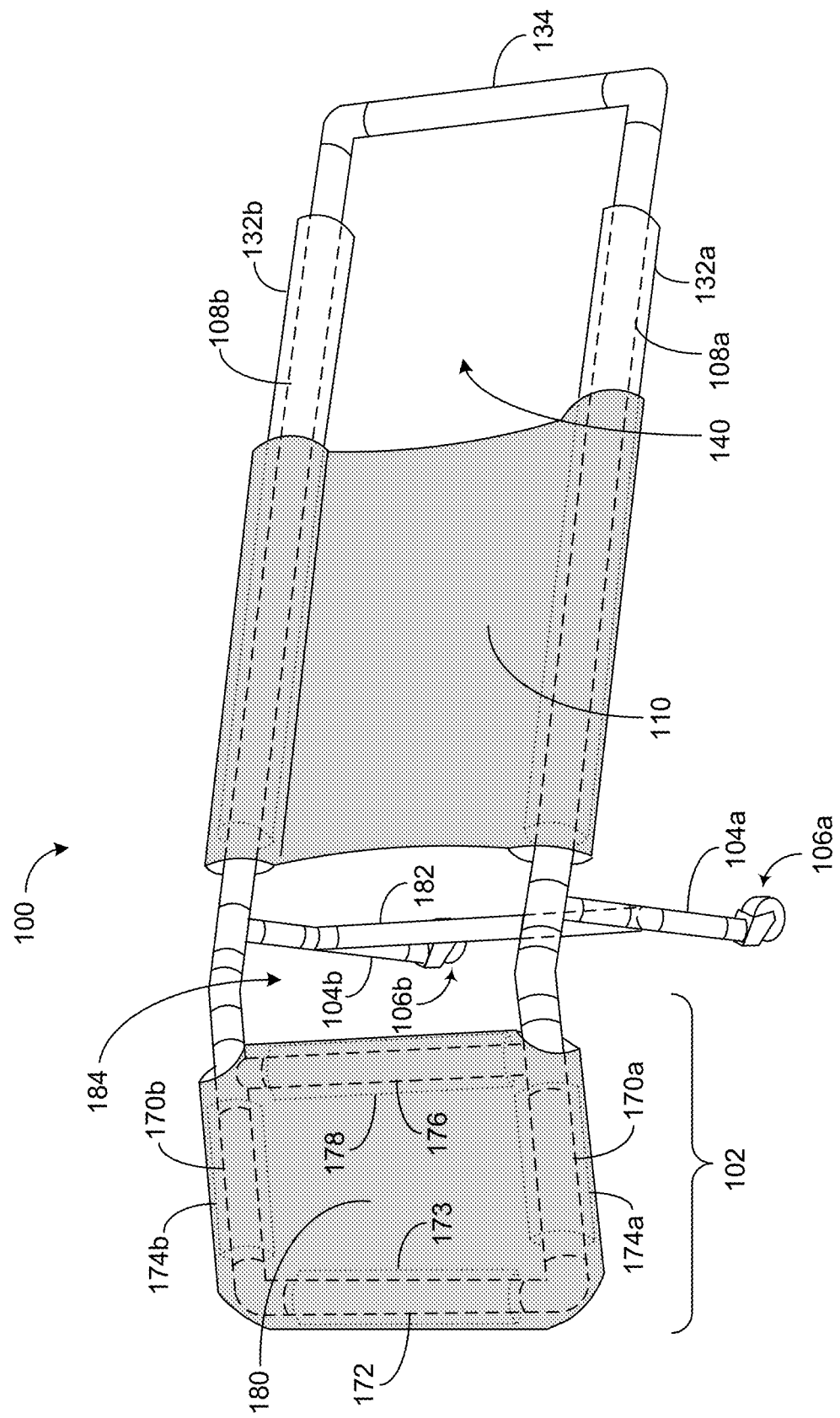
FIG. 7 shows a perspective view of the walker of FIG. 6.

FIGS. 6 and 7 show a fourth example embodiment of the walker 100 of FIGS. 1 and 2. In the example of FIGS. 6 and 7, a walker 100 can be configured to be similar to the example of FIG. 3, but with an angled front support structure 102 rather than a step-down front support structure (102 in FIG. 3). FIG. 6 depicts a side view of the walker 100, and FIG. 7 depicts a perspective view of the walker of FIG. 6.

FIGS. 6 and 7 show that in some embodiments, a walker 100 can include a body frame having first and second main members 108a, 108b, similar to the example of FIG. 3. Such main members can extend generally longitudinally when in use, and can have an appropriate length and be spaced laterally to accommodate a dog's torso. In some embodiments, the first and second main members 108a, 108b can be secured at or near their back ends by a lateral brace member 134.

In the example of FIGS. 6 and 7, the walker 100 can further include a front support structure 102 having first and second front members 170a, 170b. Such front members can extend at a downward angle (relative to the generally longitudinal extension of the first and second main members 108a, 108b) when in use, and can have an appropriate length and be spaced laterally to accommodate the dog's front legs. In some embodiments, the first and second front members 170a, 170b can be secured at or near their front ends by a first lateral brace member 172. The first and second front members 170a, 170b can also be secured at a second location (e.g., midway or towards the back ends of the first and second front members 170a, 170b) by a second lateral brace member 176.

In the example of FIGS. 6 and 7, the front end of the first main member 108a of the body frame is shown to be coupled to the back end of the first front member 170a of the front support structure 102 by a first angled joint 171a. Similarly, the front end of the second main member 108b of the body frame is shown to be coupled to the back end of the second front member 170b of the front support structure 102 by a second angled joint 171b. In some embodiments, the angled joints (171a, 171b) can be configured to provide a fixed angle between the front members (170a, 170b) and the main members (108a, 108b). In some embodiments, the angled joints (171a, 171b) can be configured to provide an adjustable angle (e.g., two or more different angles) between the front members (170a, 170b) and the main members (108a, 108b). In some embodiments, the angled joints (171a, 171b) can be configured to provide a folding functionality. For example, the front support structure 102 can be folded towards the upper or lower portion of the main members (108a, 108b) to reduce the longitudinal dimension of the walker 100 when not in use with a dog.

In the example of FIGS. 6 and 7, the first and second front members 170a, 170b are shown to angle downward from a plane defined by the first and second main members 108a, 108b. Accordingly, the front-legs of a dog using the walker 100 can rest on the front support structure 102 in a relatively comfortable position (e.g., when standing or walking). As described herein, such one or more downward angles of the front support structure 102, and/or the dimensions of the front support structure 102, can be selected based on, for example, the dog's size and/or other physical characteristics.

In the example of FIGS. 6 and 7, the walker 100 is shown to further include a leg assembly having a first leg 104a associated with the first main member 108a, and a second leg 104b associated with the second main member 108b. More particularly, the upper portion of the first leg 104a is shown to be secured to a location at or near the front portion of the first main member 108a by a first leg joint 181a, and the upper portion of the second leg 104b is shown to be secured to a location at or near the front portion of the second main member 108b by a second leg joint 181b.

In some embodiments, the leg assembly of the walker 100 of FIGS. 6 and 7 can further include a lateral brace 182 between the first and second legs 104a, 104b. Such a lateral brace can be positioned along the first and second legs 104a, 104b so as to, for example, provide strength to the leg assembly and to provide sufficient room for the upper portions of the dog's front legs when the walker 100 is in use.

The lower portion of each of the first and second legs 104a, 104b is shown to include a wheel (106a, 106b) to facilitate mobility for the dog when the dog is placed in the walker 100. In some embodiments, the wheels 106a, 106b can be configured to swivel to thereby allow the dog/walker assembly to move in different directions, propelled by, for example, the dog's rear legs.

In some embodiments, the leg joints (181a, 181b) of the example walker 100 of FIGS. 6 and 7 can be configured to provide a fixed angle (e.g., about 90 degrees, or at an angle that puts the dog's torso in a comfortable orientation when standing or walking) between the legs (104a, 104b) and the main members (108a, 108b). In some embodiments, the leg joints (181a, 181b) can be configured to provide an adjustable angle (e.g., two or more different angles) between the legs (104a, 104b) and the main members (108a, 108b). In some embodiments, the leg joints (181a, 181b) can be configured to provide a folding functionality. For example, the leg assembly including the legs (104a, 104b) and the lateral brace 182 can be folded towards the lower portion of the main members (108a, 108b) to reduce the vertical dimension of the walker 100 when not in use with a dog.

In some embodiments, the walker 100 of FIGS. 6 and 7 can be configured such that the angled joints (171a, 171b) and the leg joints (181a, 181b) provide folding functionality. With such folding capability, and as an example, the leg assembly can be folded towards the lower portion of the main members (108a, 108b), and the front support structure 102 can also be folded towards the lower portion of the main members (108a, 108b), such that the leg assembly is folded between the members (108a, 108b) and the folded front support structure 102. In such a folded configuration, the walker 100 can have significantly reduced longitudinal and vertical dimensions.

In the example of FIGS. 6 and 7, the front support structure 102 can include a panel 180 that covers some or all of the area defined by the first and second front members 170a, 170b and the lateral brace members 172, 176. Such a panel can allow the dog's front legs to rest thereon. Such a panel can be implemented as, for example, a generally rigid panel or a flexible panel (e.g., fabric, carpet, etc.). In some embodiments, the front support structure 102 may or may not include one or more straps to secure the dog's front legs when such legs are resting on the panel 180.

In the example of FIGS. 6 and 7, a body support 110 can be provided to support the dog's torso. Such a body support can be implemented between the first and second main members 108a, 108b. In some embodiments, such a body support can be implemented as, for example, a flexible member (e.g., fabric) to generally wrap around the lower and lower-side portions of the dog's torso. In some embodiments, the body support 110 may or may not include one or more straps (e.g., such as the example straps 112a, 112b of FIG. 1) to secure the dog's torso to the walker 100.

In the example of FIGS. 6 and 7, the body support 110 can be dimensioned so as to provide an opening 184 at or near the front portion of the first and second main members 108a, 108b, and an opening 140 at or near the rear portion of the first and second main members 108a, 108b. The front opening 184 can be dimensioned to, for example, accommodate the upper portion of the dog's front legs as the front legs are supported by the front support structure 102. The rear opening 140 can be dimensioned to, for example, accommodate the dog's hip and thereby allow the dog's rear legs to move freely, including movements associated with walking and sitting.

In some embodiments, some or all of the various extensions (e.g., first and second main members 108a, 108b, lateral brace 134, first and second front members 170a, 170b, lateral braces 172, 176) may or may not be covered by cushioned sleeves to facilitate comfort for the dog. For example, cushioned sleeves 132a, 132b can be provided for the first and second main members 108a, 108b. Similarly, cushioned sleeves 174a, 174b can be provided for the first and second front members 170a, 170b. Similarly, cushioned sleeves 173 and 178 can be provided for the lateral braces 172 and 176, respectively.

In some embodiments, various members, sections, extensions, etc. as described herein can be implemented to provide desire properties, such as mechanical strength, relatively light weight, etc. For example, hollow tubings can be utilized to provide relatively high strength-to-weight ratios. For a given member, section, extension, etc., such a piece can be a single piece or formed from a plurality of pieces joined together. For an assembly involving first and second pieces, such an assembly can be formed by permanently attaching the two pieces, securing the two pieces to be capable of being disassembled, or in any combination thereof. Further, such an assembly of two pieces can include a joint configured to provide a fixed orientation between the two pieces, or to provide an adjustable orientation between the two pieces (e.g., different angles and/or folding capability).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A walker for an animal, comprising:
a body support assembly including a body frame with a front portion and a rear portion, and a body support member secured to the body frame and configured to provide support for a torso of the animal, the rear portion of the body frame configured to allow a range of motion of one or more rear legs of the animal on a surface;
a front support assembly coupled to the front portion of the body frame and configured to allow one or more front legs of the animal to rest thereon such that the one or more front legs are held away from the surface; and
a leg assembly coupled to the body support assembly, and configured to provide support for the animal in place of the one or more front legs, and to allow motion of the animal on the surface based on the range of motion of the one or more rear legs, the leg assembly including first and second legs having respective upper ends coupled to the front portion of the body frame, the leg assembly further including a lateral brace member implemented between the first and second legs.

2. The walker of claim 1, wherein the body frame includes first and second main members each extending in an approximately longitudinal direction, and at least one lateral brace member implemented between the first and second main members.

3. The walker of claim 2, wherein the at least one lateral brace member includes a first lateral brace member that joins the first and second main members at or near the rear portion of the body support assembly.

4. The walker of claim 2, wherein the body support member includes a fabric piece having first and second side portions secured to the first and second main members, respectively.

5. The walker of claim 4, wherein the fabric piece further includes a rear portion dimensioned to facilitate the range of motion of the one or more rear legs of the animal.

6. The walker of claim 1, wherein each of the first and second legs includes a lower end having a wheel configured to facilitate the motion of the animal.

7. The walker of claim 1, wherein the leg assembly is coupled to the front portion of the body frame such that the leg assembly is in a fixed orientation relative to the body frame.

8. The walker of claim 1, wherein the leg assembly is coupled to the front portion of the body frame such that the leg assembly is capable of being in a plurality of orientations relative to the body frame.

9. The walker of claim 8, wherein the leg assembly is capable of being folded and unfolded relative to the body frame.

10. The walker of claim 1, wherein the front support assembly includes a front frame coupled to the front portion of the body frame, the front frame including first and second front members and at least one lateral brace member that joins the first and second front members.

11. The walker of claim 1, wherein the body support assembly further includes one or more straps coupled to the body frame and configured to secure the torso of the animal to the body support member.

12. A walker for an animal, comprising:
a body support assembly including a body frame with a front portion and a rear portion, and a body support member secured to the body frame and configured to provide support for a torso of the animal, the rear portion of the body frame configured to allow a range of motion of one or more rear legs of the animal on a surface;
a front support assembly including a front frame coupled to the front portion of the body frame, the front frame including first and second front members and at least one lateral brace member that joins the first and second front members, the front support assembly further including a panel secured to some or all of the front frame and configured to allow one or more front legs of the animal to rest thereon such that the one or more front legs are held away from the surface; and
a leg assembly coupled to the body support assembly, and configured to provide support for the animal in place of the one or more front legs, and to allow motion of the animal on the surface based on the range of motion of the one or more rear legs.

13. The walker of claim 12, wherein the front frame is coupled to the front portion of the body frame such that planes defined by the front frame and the body frame are approximately parallel, with the plane of the front frame being lower than the plane of the body frame when the walker is in use.

14. The walker of claim 12, wherein the front frame is coupled to the front portion of the body frame such that a plane defined by the front frame angles downward from a plane defined by the body frame when the walker is in use.

15. A method for providing mobility for a dog having one or more injured or disabled front legs, the method comprising:
supporting the dog's torso with a body support assembly including a body frame with a front portion and a rear portion, and a body support member secured to the body frame and configured to support the torso of the dog, the rear portion of the body frame configured to allow a range of motion of the dog's rear legs on a surface;
supporting the dog's front legs with a front support assembly coupled to the front portion of the body frame, such that the front legs are held away from the surface; and
providing support for the dog in place of the front legs with a leg assembly coupled to the body support assembly, the leg assembly configured to allow motion of the dog on the surface based on the range of motion of the rear legs, the leg assembly including first and second legs having respective upper ends coupled to the front portion of the body frame, the leg assembly further including a lateral brace member implemented between the first and second legs.

16. A kit for an injured or disabled dog, the kit comprising a walker that includes a body support assembly including a body frame with a front portion and a rear portion, and a body support member secured to the body frame and configured to provide support for a torso of the dog, the rear portion of the body frame configured to allow a range of motion of one or more rear legs of the dog on a surface, the walker further including a front support assembly coupled to the front portion of the body frame and configured to allow one or more front legs of the dog to rest thereon such that the one or more front legs are held away from the surface, the walker further including a leg assembly coupled to the body support assembly, and configured to provide support for the dog in place of the one or more front legs, and to allow motion of the dog on the surface based on the range of motion of the one or more rear legs, the leg assembly including first and second legs having respective upper ends coupled to the front portion of the body frame, the leg assembly further including a lateral brace member implemented between the first and second legs.

* * * * *